Patented Sept. 4, 1945

2,384,269

UNITED STATES PATENT OFFICE 2,384,269

QUICK CURING NEOPRENE CEMENT

Louis S. Bake, Penns Grove, N. J., assignor to E. I. du Pont de Nemours & Company, Wilmington, Del., a corporation of Delaware No Drawing. Application August 12, 1941, Serial No. 406,535

5 Claims. (Cl. 260—32)

This invention relates to the curing of neoprene. More specifically, the invention relates to accelerating the curing of neoprene and lowering the temperature of curing by the use of sulfur chloride.

It is known that certain compounds mildly accelerate the curing of neoprene. However, it has not previously been known to cure neoprene with sufficient speed at relatively low temperatures to make this material suitable for use in a floor or deck covering composition, in coating compositions and other places where rapid curing in the absence of high temperatures is essential or desirable.

It is an object of this invention to treat a neoprene composition so that it can be more rapidly cured than has hitherto been possible. Another object is to accelerate curing of neoprene compositions at relatively low curing temperatures. A further object is to provide a quick low-temperature-curing neoprene composition. A still further object is a neoprene composition which is stable in storage and yet has quick low-temperature curing. Other objects will appear hereinafter.

These objects have been accomplished by the discovery that the addition of sulfur chloride accomplishes the desired curing acceleration. It has further been discovered that the addition of a small amount of an alcohol or a ketone to a neoprene composition containing sulfur chloride preserves the composition without materially delaying curing under conditions of use.

This invention is applicable to "neoprene," a generic term used to include products made by polymerizing chloroprene (2-chloro-1,3-butadiene) either in the presence or absence of modifiers, such, for example, as sulfur. It is especially valuable with neoprene of a type having sulfur in chemical combination with the polychloroprene, made by polymerizing chloroprene, in the presence of elementary sulfur, the effect of the sulfur chloride being more marked with this type. The sulfur may amount to as much as is soluble in the chloroprene; i. e., up to about 2 per cent of the weight of the chloroprene. This material is hereinafter referred to as "sulfur-neoprene." The polymerization is preferably carried out in emulsion. Emulsifying agents, antioxidants, agents for controlling polymerization rate, etc., may be used all as known in the prior art. Although not preferred, massive or solution polymerization may be used.

In order that the processes of preparing polymeric materials especially suitable for the present invention may be more fully understood, the following processes are set forth in detail by way of illustration, but it is to be understood that the processes are not limited to such illustration.

PROCESS A

One and five-tenths (1.5) parts of sulfur was dissolved in 100 parts of chloroprene by first dissolving the sulfur in 3 parts of a chlorinated naphthalene having a melting point of 90° C. to 95° C. at 125° C. and stirring this hot solution into the chloroprene in which 4 parts of wood rosin had already been dissolved at 40° C. This solution was then emulsified in 233 parts of water containing 0.5 part of ammonium persulfate, 0.5 part of the sodium salts of the dinaphthylmethane sulfonic acids prepared according to U. S. Patent No. 1,191,480 and 0.8 part of sodium hydroxide. The resulting dispersion was then maintained at 40° C., by cooling and heating as necessary, until the density reached 1.050. At this point, the dispersion was treated with 1 part of phenyl-beta-naphthylamine dispersed in sodium abietate solution, neutralized with acetic acid, and coagulated in the form of a continuous sheet as described in the U. S. Patent No. 2,187,146 to Calcott and Starkweather, by freezing it in a thin layer on the surface of a rotating, internally cooled drum, allowing the thin layer to remain in contact with the freezing surface for a length of time such that, on removing the film from the drum and allowing the ice therein to melt, a continuous sheet of completely coagulated material remained. The sheet was then washed by passing it under sprays of water while supported on a moving belt and dried by passage through a chamber through which air heated to 80° C. was passing. Four per cent (4%) of tetramethyl thiuram disulfide was then incorporated into the dry polymer by milling and the product was then ready for storage, shipment, or use.

PROCESS B

A polymer was prepared according to the process of Process A except that 2 per cent of sulfur was used.

PROCESS C

Chloroprene (100 parts) was emulsified in a solution made by dissolving 5 parts of the sodium salts of sulfated oleyl acetate, 0.5 part of sodium thioglycolate, and 0.2 part of sodium hydrosulfide (NaHS) in 188 parts of water and acidifying with hydrochloric acid to liberate the thioglycolic acid and hydrogen sulfide. The resulting dispersion was maintained at 40° C. until the density had increased to a point indicating that 95 per cent of the chloroprene had polymerized. A dispersion of 0.5 part of phenyl-beta-naphthylamine and 0.5 part of tetramethyl thiuram disulfide in 6 parts of water containing a small amount of the above sulfated oleyl acetate sodium salts was then added.

One hundred and eighty (180) parts of this latex-like dispersion was treated with agitation with 15 parts of a 3 per cent solution of hydrated aluminum sulfate, $Al_2(SO_4)_3 \cdot 18H_2O$. Rapid and complete coagulation took place. The coagulum was then washed for a short time with water on a rubber mill with corrugated rolls, then dried by further milling on a warm smooth roll mill.

In order to practice the present invention, the neoprene is compounded and cured as described hereinafter. By way of illustration, the following examples, wherein "parts" mean "parts by weight," are given, but the invention is not limited thereto as will appear more fully hereinafter.

EXAMPLE I

A base cement was made by mixing together the following:

| Base cement | Parts |
| --- | --- |
| Sulfur-neoprene made according to Process A | 100 |
| Hexamethylene-ammonium-hexamethylene-dithiocarbamate | 1 |
| Phenyl-beta-naphthylamine | 2 |
| Zinc oxide | 5 |
| Carbon black | 50 |
| Solvent | 300 |

When 2 parts of sulfur chloride are mixed with 100 parts of the above base cement, a mixture is obtained, which, when brushed onto a supporting surface, will dry and become cured at ordinary room temperatures in approximately 72 hours. Quicker curing may be obtained by subjecting the film to elevated temperatures.

EXAMPLE II

A plastic composition having a consistency similar to that of putty is prepared according to the following formula:

| Base composition | Parts |
| --- | --- |
| Sulfur-neoprene made according to Process A | 100 |
| Diortho-tolyl-guanidine | 4 |
| Magnesium oxide | 4 |
| Zinc oxide | 5 |
| Phenyl-beta-naphthylamine | 2 |
| Blanc fixe | 150 |
| Chlorinated diphenyl | 50 |

To 100 parts of the above base composition is added a paste of the following composition:

| | Parts |
| --- | --- |
| Sulfur chloride | 5 |
| Chlorinated diphenyl | 5 |
| Blanc fixe | 20 |

The resultant product stays workable for several hours and becomes cured to an elastic, non-plastic body in approximately 24 hours at room temperature.

EXAMPLE III

A base cement was made by mixing together the following:

| Base cement | Parts |
| --- | --- |
| Neoprene made according to Process C | 100 |
| Hexamethylene-ammonium-hexamethylene-dithiocarbamate | 1 |
| Phenyl-beta-naphthylamine | 2 |
| Zinc oxide | 5 |
| Carbon black | 50 |
| Solvent | 294 |

When 1.7 parts of sulfur chloride was mixed with 100 parts of the above cement, it gelled in 6 minutes. Five (5) parts of ethyl alcohol inhibited gelation. When a film of 100 parts of the above cement containing 1.7 parts of sulfur chloride and 5 parts of ethyl alcohol was brushed upon a supporting surface, it was cured in 5 days at room temperature. A similar film without the sulfur chloride and alcohol did not cure under these conditions.

The amount of sulfur chloride may, in general, vary from 0.1 to 35 parts to 100 parts of the neoprene depending upon the desired time of workability and curing. It is impracticable to use over 35 parts of sulfur chloride per 100 parts of neoprene as curing with larger amounts takes place so rapidly that the time of workability is too short for practicable purposes.

Although the sulfur chloride is preferably intimately mixed with the base composition, this is not essential. Thus, the base cement of Example I may be brushed onto a supporting surface and allowed to dry to an uncured film. Sulfur chloride may then be applied to the film either alone or in a solution of an organic solvent such as benzene or carbon tetrachloride. This procedure vulcanizes the film only to the depth of the sulfur chloride penetration, thus producing a film having a cured outer surface and a soft uncured inner surface next to the supporting material whereby improved adhesion is obtained. This same procedure may be adapted in compositions similar to that disclosed in Example II where it is desirable to have a cured surface with a soft plastic, non-cured material beneath; for example, in certain types of caulking or crack-filling operations.

In the use of sulfur chloride for curing neoprene according to the present process, it is highly desirable that the composition contain an acid acceptor which will neutralize any acid formed during the curing step. Zinc oxide and magnesium oxide are examples of suitable acid acceptors. In the first example of this specification, the amount of zinc oxide present is sufficient to render the composition neutral to litmus. It is desirable to point out that the neoprene composition itself is quite satisfactory in the absence of an acid acceptor because the acid does not have a seriously deleterious effect upon the neoprene. However, as will be pointed out more fully below, the composition of the present invention is very useful for coating materials which would be corroded or rotted by acid and the acid acceptor acts to preserve the material in contact with which the composition is to be used.

Neoprene cements having added sulfur chloride tend to gel rapidly; thus, if 1.8 grams of sulfur chloride are added to 100 grams of the base cement of Example I, gelation occurs in approximately 4 hours, after which the compound is useless for brushing or dipping. It is, therefore, desirable that the composition contain a material which will stabilize it against gelation. It has been found that the addition of a small amount of an alcohol or ketone, volatile at the curing temperature, for example, methyl, ethyl and amyl alcohols, acetone, etc., prevent gelation. The amount of alcohol is not critical, but, in general, a few per cent of alcohol is sufficient. When the composition is used as a coating, adhesive, or impregnating composition, the alcohol or ketone evaporates and the curing occurs as though the alcohol or ketone had never been present. Ethyl alcohol is preferred. Alcohols and ketones having not more than 5 carbon atoms are especially suitable for the purpose. Mixtures of alcohols, mixtures of ketones, or mixtures of one or more alcohols with one or more ketones can be used. In fact, under some circumstances, it may be advantageous to have both an alcohol and a ketone present, as, for example, ethyl alcohol and acetone.

The consistency of the composition may be varied by the use of greater or lesser amounts of solvent. In general, cements range from about 10 per cent to about 65 per cent sulfur-neoprene and putties range from about 65 per cent to about 85 per cent sulfur-neoprene. Any inert volatile organic solvent may be used, such, for example, as benzene, toluene, xylene, carbon tetrachloride, trichloromethane, etc. The solvent of Example I was a mixture of xylene and "Solveso No. 1" (a hydrogenated substitute for toluene).

Conventional compounding ingredients for rubber and rubber-like materials may be present in the composition; also fillers, pigments, etc., such as are found in coating, caulking, and molding compositions. Depending upon the consistency and compounding ingredients, the herein disclosed compositions have many uses. They may be used as adhesives, for leather, wood, fabric, metal, and other materials; as coating for chemical processing and storage equipment to prevent corrosion; as an impregnating composition for porous material such as cork, fabric, wood, etc.; as a veneer over rubber articles to protect them from sunlight, oxidation, or other deleterious influences; and as a bonding agent for comminuting material such as abrasives, cork dust, cork granules, leather scrap, asbestos, etc. Plastic compositions may be used for the protection of steel or wood equipment or pipe surfaces or, in fact, any material where it is impracticable to heat to cause curing of the coating composition. Where the use of heat is not objectionable, the compositions are especially useful where it is desired to shorten the curing time. Thus, at 121° C., thin films containing 1 part of sulfur chloride per 100 parts of base cement may be cured in about 5 minutes. The plastic compositions are also suitable for caulking as acid-resistant mortar, for setting up bricks in chemical equipment, etc., covering floors, decks, and steps. Because of the fact that the composition may be cured at or above ordinary room temperatures in short periods of time, it can be used on large pieces of equipment which could not be easily heated or which, in fact, it would be impossible to raise to the curing temperatures of prior art compositions.

The cements made according to the present invention not only have the advantage of quick curing at low temperatures, but also have improved body. Thus, 2 or 3 coats of these cements give good bonds where a much larger number of coats of other cements are frequently necessary. The following examples where "parts" mean "parts by weight" illustrate this feature.

EXAMPLE A

*Adhesion of cured neoprene to itself*

Two (2) strips of cured neoprene composition (6" x 1") were adhered together as follows:

The neoprene surface was roughened with sand paper and given 1 coat each of the accelerated neoprene cement described in Example I. After drying for 2 hours, the strips were rolled together and heated for 18 hours at 70° C. A pull of 24 pounds per linear inch was required to strip the films.

EXAMPLE B

*Adhesion of cured rubber to itself*

Rubber test pieces were prepared and the films adhered as above in Example A. A pull of 22 pounds per linear inch was required to separate the film.

EXAMPLE C

*Adhesion of cured neoprene to cured rubber*

Test pieces were prepared and the films adhered as in Example A. A pull of 23 pounds was required to strip the films.

EXAMPLE D

*Adhesion of cured rubber to steel*

The metal was sand blasted and given 1 coat of a priming cement having the following composition:

|  | Parts by weight |  |
|---|---|---|
| Neoprene | 5,000 |  |
| Phenyl-beta-naphthylamine | 100 |  |
| Extra light calcined magnesia | 500 |  |
| Wood rosin | 250 |  |
| Cotton seed oil | 250 | part A |
| Semi-reinforcing carbon black | 2,500 |  |
| Sulfur | 50 |  |
| Zinc oxide | 500 |  |
| Toluene | 36,550 |  |
| Toluene | 85 | part B |
| Chlorinated rubber | 14 |  |

Fourteen (14) parts of part A are mixed with 68 parts of part B.

This priming cement coating was followed by one coat of the cement described in Example I. The cured rubber was roughened and given 1 coat of neoprene cement of Example I. After drying for 2 hours at room temperature, the film was rolled into intimate contact with the cement on the metal and heated for 18 hours at 70° C. A pull of 25 pounds per linear inch was required to strip the film from the metal.

EXAMPLE E

*Adhesion of cured neoprene to steel*

Test pieces were prepared and treated as in Example D using cured neoprene in place of cured rubber. A pull of 21 pounds per linear inch was required to strip the film from the metal.

It is apparent that many widely different embodiments of this invention may be made without departing from the spirit and scope thereof, and, therefore, it is not intended to be limited except as indicated in the appended claims.

I claim:

1. A relatively rapid, low temperature curing polychloroprene composition comprising a mixture of uncured polychloroprene, from 0.1% to 35% of sulfur chloride, based on the weight of the polychloroprene, a volatilizable liquid of the class consisting of alcohols and ketones which contain less than six carbon atoms, and an inert volatile organic solvent.

2. A relatively rapid, low temperature curing polychloroprene composition comprising a mixture of uncured polychloroprene, from 0.1% to 35% of sulfur chloride, based on the weight of the polychloroprene, a volatilizable liquid of the class consisting of alcohols and ketones which contain less than six carbon atoms, an acid acceptor, and an inert volatile organic solvent.

3. A relatively rapid, low temperature curing polychloroprene composition comprising a mixture of uncured polychloroprene obtained by polymerizing chloroprene in the presence of an amount of elementary sulfur up to 2% of the weight of the chloroprene, from 0.1% to 35% of sulfur chloride, based on the weight of the polychloroprene, a volatilizable liquid of the class consisting of alcohols and ketones which contain less than six carbon atoms, and an inert volatile organic solvent.

4. A relatively rapid, low temperature curing polychloroprene composition comprising a mixture of uncured polychloroprene obtained by polymerizing chloroprene in the presence of an amount of elementary sulfur up to 2% of the weight of the chloroprene, from 0.1% to 35% of sulfur chloride, based on the weight of the polychloroprene, ethyl alcohol, and an inert volatile organic solvent.

5. A relatively rapid, low temperature curing polychloroprene composition comprising a mixture of uncured polychloroprene obtained by polymerizing chloroprene in the presence of an amount of elementary sulfur up to 2% of the weight of the chloroprene, from 0.1% to 35% of sulfur chloride, based on the weight of the polychloroprene, ethyl alcohol, an acid acceptor, and an inert volatile organic solvent.

LOUIS S. BAKE.